No. 692,315. Patented Feb. 4, 1902.
J. W. R. LAXTON.
AMALGAMATOR.
(Application filed Nov. 16, 1900.)

(No Model.) 2 Sheets—Sheet 1.

Witnesses:
Daniel Stanwood
Anton M. Hyman

Inventor:
John W. R. Laxton
by Chas. H. Drew
Attorney.

No. 692,315. Patented Feb. 4, 1902.
J. W. R. LAXTON.
AMALGAMATOR.
(Application filed Nov. 16, 1900.)

(No Model.) 2 Sheets—Sheet 2.

Witnesses:
Daniel Stanwood
[signature]

Inventor:
John W. R. Laxton
by [signature]
Attorney.

UNITED STATES PATENT OFFICE.

JOHN W. R. LAXTON, OF LYNN, MASSACHUSETTS.

AMALGAMATOR.

SPECIFICATION forming part of Letters Patent No. 692,315, dated February 4, 1902.

Application filed November 16, 1900. Serial No. 36,714. (No model.)

*To all whom it may concern:*

Be it known that I, JOHN W. R. LAXTON, of Lynn, in the county of Essex and State of Massachusetts, have invented an Improved Amalgamator, of which the following is a specification, reference being had to the accompanying drawings, in which—

Figure 1:
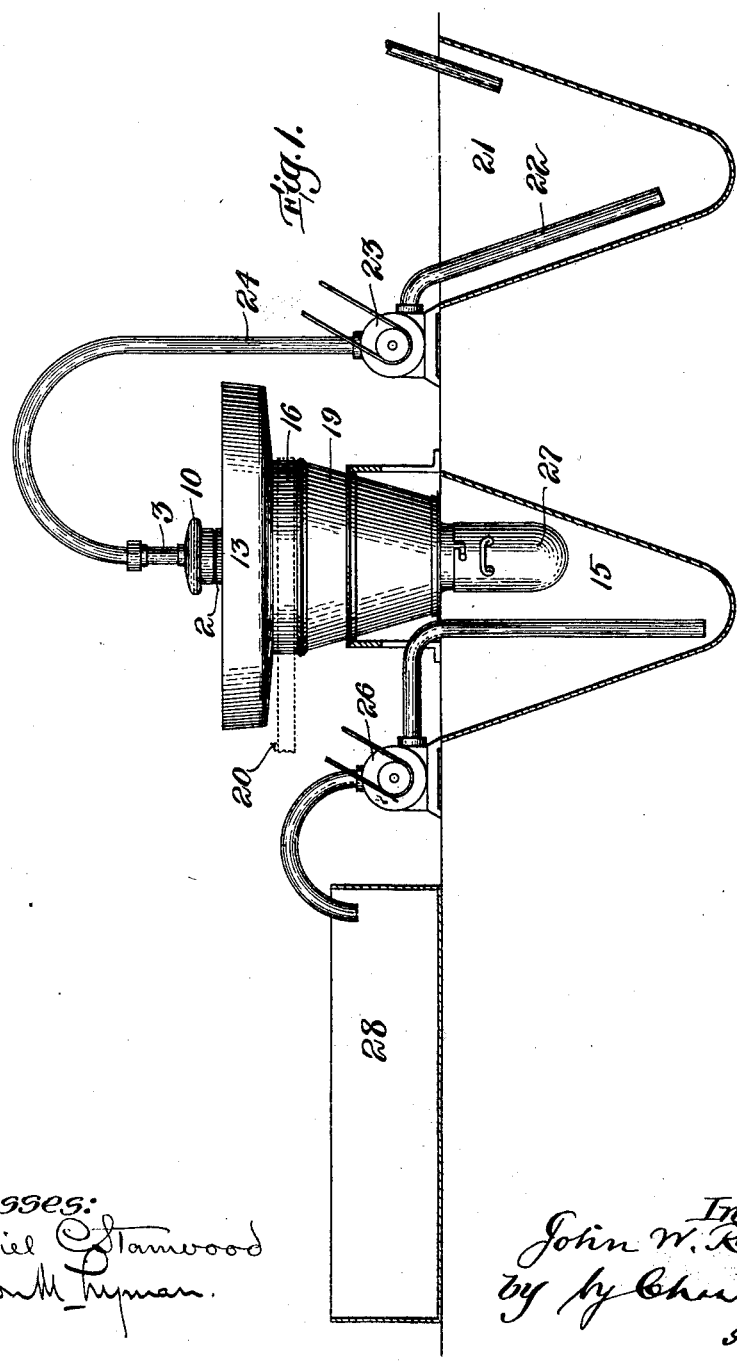
Figure 2:
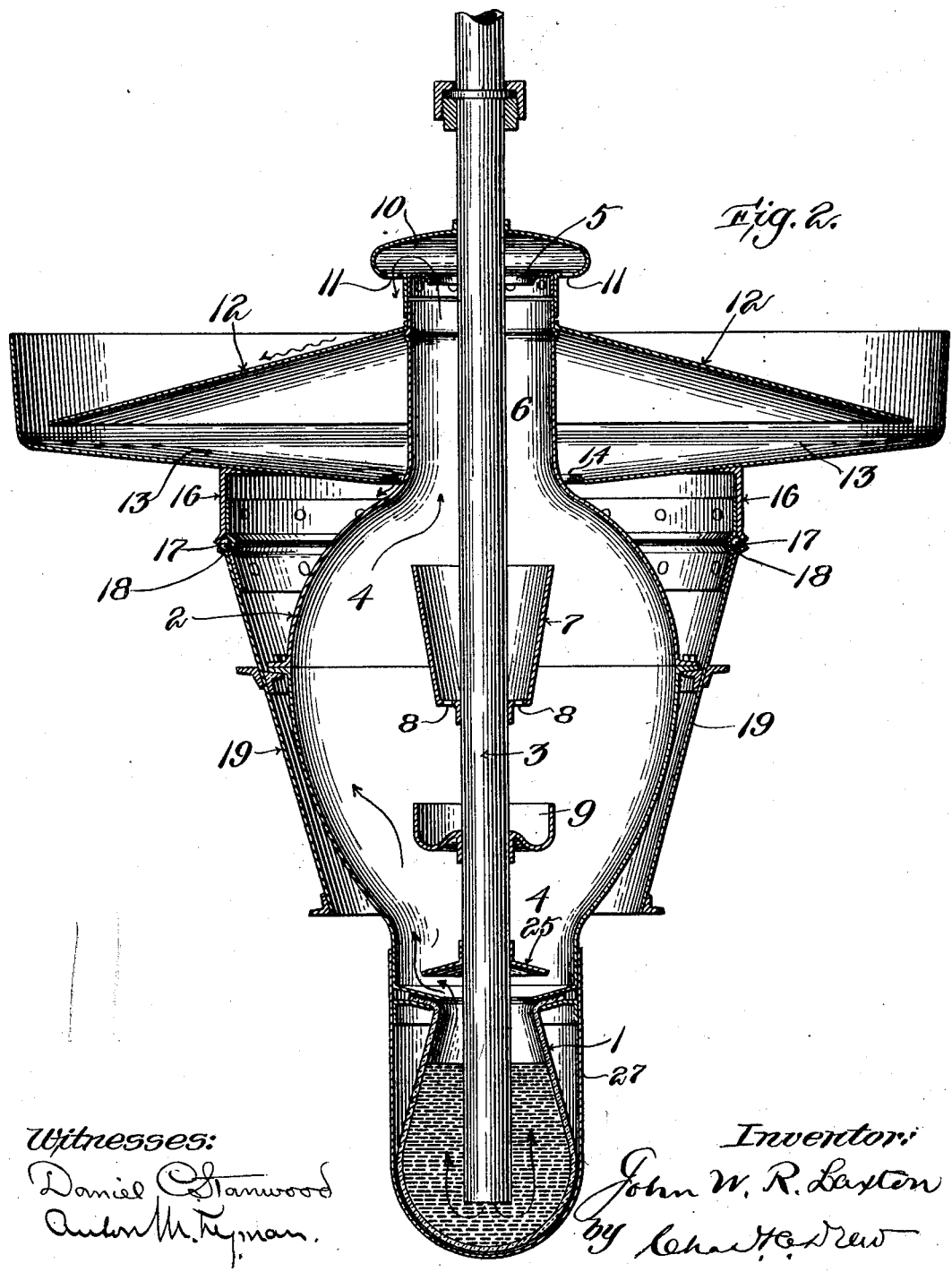

Figure 1 is an elevation, partly in section, of an amalgamator embodying my invention.
Fig. 2 is a central vertical section of a portion of the amalgamator shown in Fig. 1.

My invention is an improved amalgamator for separating precious metals from ore, comprising, essentially, a vessel holding a body of mercury and means for passing mixed pulverized ore and water through and in close contact with the body of mercury in the vessel.

In the best form of my invention shown in the drawings the vessel 1 holds a body of mercury and constitutes the bottom of a tank 2. Mixed pulverized ore and water under pressure is admitted to vessel 1 through pipe 3, whose discharge end is within and near the bottom of the vessel 1, so that as the pulverized ore and water discharges from pipe 3 it rises through the mercury to chamber 4 above vessel 1. Vessel 1, which constitutes the bottom of tank 2, is preferably of glass and is held in place and protected by a cover 27, which is detachably connected with the lower portion of tank 2 by means of a pin-and-slot connection, as shown in Fig. 1. The outlet 5 from chamber 4 is at the top of a restricted passage 6 at the top of chamber 4, and outlet 5, passage 6, and chamber 4 are in line directly above vessel 1, so that after the ore and water has passed through the mercury into chamber 4 it must pass upwardly for a considerable distance before it is deflected sidewise and discharged from tank 2, the purpose being to give opportunity for the small particles of mercury which have become entrained by the ore and water to settle toward the bottom and middle of the tank, and this they tend to do as they near the top of the chamber, because the ore and water at the top and middle of the tank is the least agitated portion of the contents. As these small particles of mercury settle toward the bottom they are entrapped by the cup 7, fast to pipe 3, from which they discharge through openings 8 in the bottom of the cup into a cup 9, fast to pipe 3, or else they are caught and held by cup 9 itself. In this way most of the loose particles of mercury are separated from the discharge. From passage 6 the ore and water discharges through outlet 5 into dome 10, from which it discharges through openings 11 onto an apron 12, fast to the tank, and from apron 12 the ore and water falls upon pan 13 and thence through a central opening 14 in pan 13 into a receptacle 15 below the tank. The inside surface of the bottom of pan 13 is silver-plated, and as the ore and water flows over that surface any minute particles of mercury not previously separated from the discharge and collected in cups 7 and 9 adhere thereto and are collected in pan 13, so that when discharged into receptacle 15 all or practically all of the mercury has been removed from the discharge. I have found it desirable for the best results to impart to pan 13 a slow rotary movement, and for this reason I have shown an annular ring 16, fast to the bottom of pan 13, which rests on balls 17 in a raceway 18 at the top of a cylindrical wall 19, which rests on a frame projecting up from the ground, and ring 16 is used as a pulley around which a belt 20 (shown by dotted lines in Fig. 1) may be passed, which is driven from any convenient source of power.

The operation is as follows: Mixed pulverized ore and water is drawn from a receptacle 21 through pipe 22 by a suitable pump 23, by which it is forced under pressure through pipe 24 and pipe 3 into and through vessel 1, holding the body of mercury. From vessel 1 the ore and water flows into chamber 4, and upon entering the latter it strikes deflector 25, fast to pipe 3, and is caused to pass upwardly through chamber 4 near the surrounding wall, and while in chamber 4 it is kept agitated by the constant inflow of ore and water under pressure, and most of the mercury entrained by the ore and water is separated therefrom and collected in cups 7 and 9. The discharge then leaves chamber 4 through passage 6 and outlet 5 and enters dome 10, from which it is discharged through openings 11 onto apron 12, and from apron 12 it passes into the revolving silver-plated pan 13, which collects and separates from the discharge the remaining small particles of mercury. After having been discharged from pan 13 into receptacle 15 the ore and water may be removed by a pump 26 to a settling-tank 28, as shown in Fig. 1, or, if there be a series of amalagmating-tanks 2 employed, to the next tank 2 of the series, and so on until it has passed through the last tank of the series, when it is discharged into the settling-tank.

By my invention not only is the ore brought into closer contact with the mercury than has heretofore been possible, but the entrained mercury is most effectually removed from the discharge and saved, thus effecting a saving in the cost of operating over those forms of amalgamators now in use.

What I claim as my invention, and desire to secure by Letters Patent, is—

1. An amalgamator comprising a mercury vessel, a tank surmounting the same with its lower part opening thereinto, said tank enlarged in diameter at the middle and having a contracted outlet at the top, means for passing mixed pulverized ore and water through a body of mercury in the vessel and thence upwardly through the tank, and one or more centrally-located receptacles in the enlarged part of the tank for catching entrained mercury, substantially as described.

2. An amalgamator comprising a mercury vessel, a tank surmounting the same with its lower part opening thereinto, said tank enlarged in diameter at the middle and having a contracted outlet at the top, a deflector at the mouth of the mercury vessel, one or more centrally-located receptacles in the enlarged part of the tank for catching entrained mercury, and means for passing mixed pulverized ore and water through a body of mercury in the vessel and thence upwardly through the tank, substantially as and for the purpose described.

3. An amalgamator comprising a mercury vessel, a tank surmounting the same with its lower part opening thereinto, said tank enlarged in diameter at the middle and having a contracted outlet at the top, an ore-inlet pipe extending downwardly through the tank and into the vessel, and one or more receptacles on said pipe for catching entrained mercury, substantially as described.

4. An amalgamator comprising a mercury vessel, a tank surmounting the same with its lower part opening thereinto, said tank enlarged in diameter at the middle and having a contracted outlet at the top, an ore-inlet pipe extending downwardly through the tank and into the vessel, a deflector on said pipe at the mouth of the vessel, and one or more receptacles on said pipe for catching entrained mercury.

5. An amalgamator comprising a mercury vessel, a tank surmounting the same with its lower part opening thereinto and an outlet at its upper end, a dome over this outlet extending laterally beyond the same and having one or more bottom discharging-openings, and means for passing mixed pulverized ore and water through a body of mercury in the vessel and thence upwardly through the tank, substantially as described.

6. An amalgamator comprising a mercury vessel, a tank surmounting the same with its lower part opening thereinto and an outlet at its upper end, a dome over this outlet and having one or more bottom discharging-openings, a conical apron encircling the upper part of the tank below the discharge-openings of the said dome, and means for passing mixed pulverized ore and water through a body of mercury in the vessel and thence upwardly through the tank, substantially as described.

7. An amalgamator comprising a mercury vessel, a tank surmounting the same with its lower part opening thereinto and an outlet at its upper end, a dome over this outlet and having one or more bottom discharging-openings, a conical apron encircling the upper part of the tank below the discharge-openings of the said dome, a centrally-discharging pan below the apron, and means for passing mixed pulverized ore and water through a body of mercury in the vessel and thence upwardly through the tank, substantially as described.

8. An amalgamator comprising a mercury vessel, a tank surmounting the same with its lower part opening thereinto and an outlet at its upper end, a dome over this outlet and having one or more bottom discharging-openings, a conical apron encircling the upper part of the tank below the discharge-openings of the said dome, a rotatable centrally-discharging pan below the apron, and means for passing mixed pulverized ore and water through a body of mercury in the vessel and thence upwardly through the tank, substantially as described.

9. An amalgamator comprising a mercury vessel, a tank surmounting the same with its lower part opening thereinto, said tank enlarged in diameter at the middle and having a contracted outlet at the top, an ore-inlet pipe extending downwardly through the tank and into the vessel, a deflector on said pipe at the mouth of the vessel, a dome surrounding the inlet-pipe over the contracted tank-outlet and having bottom discharge-openings outwardly beyond the latter, a conical apron below said dome, and a centrally-discharging pan below the apron and encircling the same.

10. An amalgamator comprising a mercury vessel, a tank surmounting the same with its lower part opening thereinto, said tank enlarged in diameter at the middle and having a contracted outlet at the top, an ore-inlet pipe extending downwardly through the tank and into the vessel, a deflector on said pipe at the mouth of the vessel, a dome surrounding the inlet-pipe over the contracted tank-outlet and having bottom discharge-openings outwardly beyond the latter, a conical apron below said dome, and a rotatable centrally-discharging pan below the apron and encircling the same.

JOHN W. R. LAXTON.

Witnesses:
ETHEL M. WINWARD,
THOMAS L. DREW.